United States Patent
Borg et al.

(10) Patent No.: US 10,388,047 B2
(45) Date of Patent: Aug. 20, 2019

(54) PROVIDING VISUALIZATIONS OF CHARACTERISTICS OF AN IMAGE

(71) Applicant: Adobe Inc., San Jose, CA (US)

(72) Inventors: Lars Borg, Kalaheo, HI (US); Patrick Palmer, Wörth (DE); Duy Anh Pham, Munich (DE); Michael Gallo, Valeggio sul Mincio (IT)

(73) Assignee: ADOBE INC., San Jose, CA (US)

( * ) Notice: Subject to any disclaimer, the term of this patent is extended or adjusted under 35 U.S.C. 154(b) by 109 days.

(21) Appl. No.: 15/046,206

(22) Filed: Feb. 17, 2016

(65) Prior Publication Data

US 2016/0247305 A1 Aug. 25, 2016

Related U.S. Application Data

(60) Provisional application No. 62/119,007, filed on Feb. 20, 2015.

(51) Int. Cl.
*G06T 11/60* (2006.01)
*G06F 3/0484* (2013.01)
*G06T 11/00* (2006.01)

(52) U.S. Cl.
CPC .......... *G06T 11/60* (2013.01); *G06F 3/04845* (2013.01); *G06T 11/001* (2013.01)

(58) Field of Classification Search
None
See application file for complete search history.

(56) References Cited

U.S. PATENT DOCUMENTS

| | | | | |
|---|---|---|---|---|
| 7,693,341 | B2* | 4/2010 | Pettigrew | H04N 1/622 382/254 |
| 8,203,571 | B2* | 6/2012 | Pettigrew | G09G 5/06 345/419 |
| 2007/0247475 | A1* | 10/2007 | Pettigrew | G09G 5/06 345/594 |
| 2010/0113091 | A1* | 5/2010 | Sharma | G06K 9/4642 455/556.1 |
| 2010/0195162 | A1* | 8/2010 | Majewicz | G09G 5/028 358/3.23 |
| 2013/0050238 | A1* | 2/2013 | Bergou | H04N 1/62 345/589 |
| 2014/0282160 | A1* | 9/2014 | Zarpas | G06F 17/30991 715/769 |
| 2015/0046862 | A1* | 2/2015 | Hansen | G06F 17/18 715/771 |

* cited by examiner

*Primary Examiner* — Bernard Krasnic
(74) *Attorney, Agent, or Firm* — Keller Jolley Preece

(57) ABSTRACT

The present disclosure is directed toward providing visualization models of image characteristics. The visualization models can allow a user to intuitively understand and optionally edit or match characteristics. For example, one or more embodiments involve generating a visualization model of colors (including their hue and saturation) within a source image. Furthermore, one or more embodiments involve enabling a user to interact with and edit the visualization model of the source image. In one or more embodiments further involve generating a transformation model based on the visualization model of the source image. A target image can be altered in accordance with the transformation model such that characteristics of the source image are matched to the target image.

20 Claims, 10 Drawing Sheets

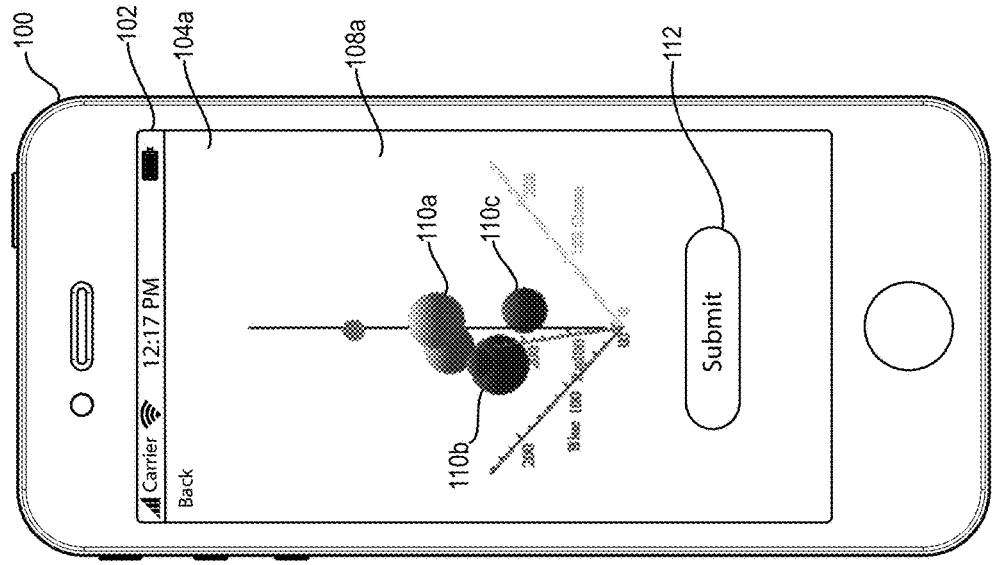
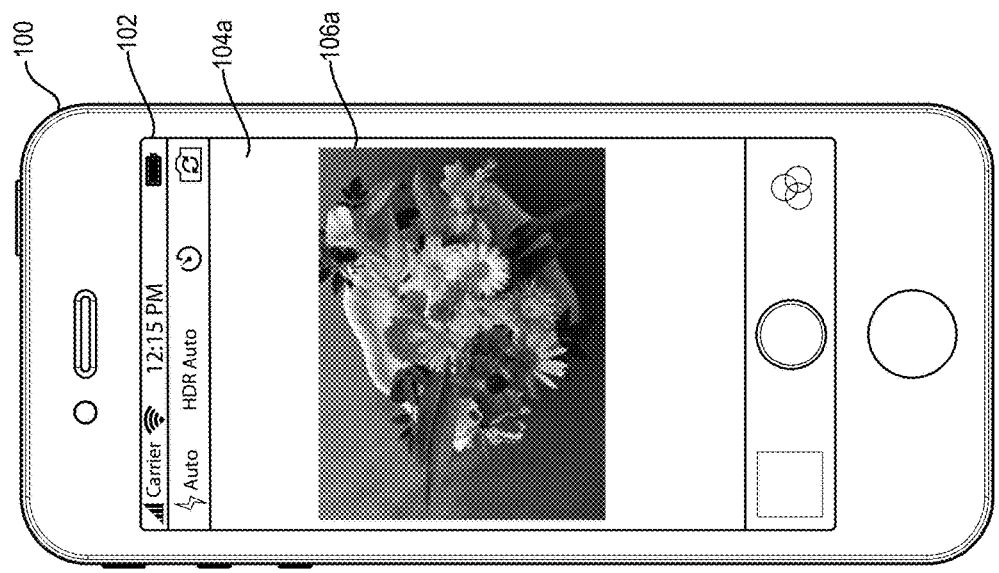
Fig. 1B
Fig. 1A

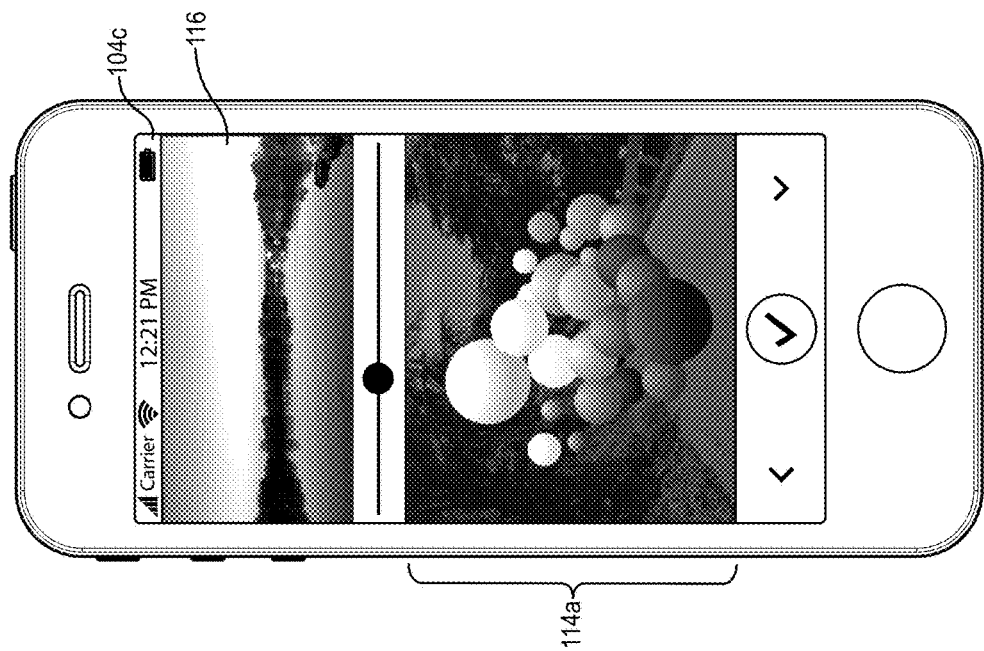
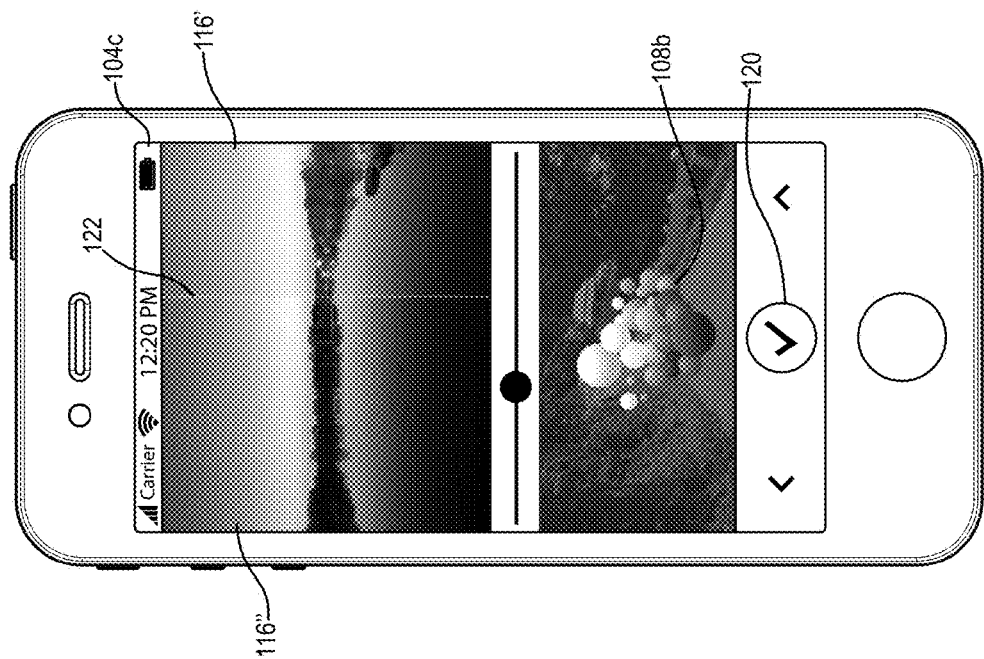
Fig. 2E
Fig. 2D

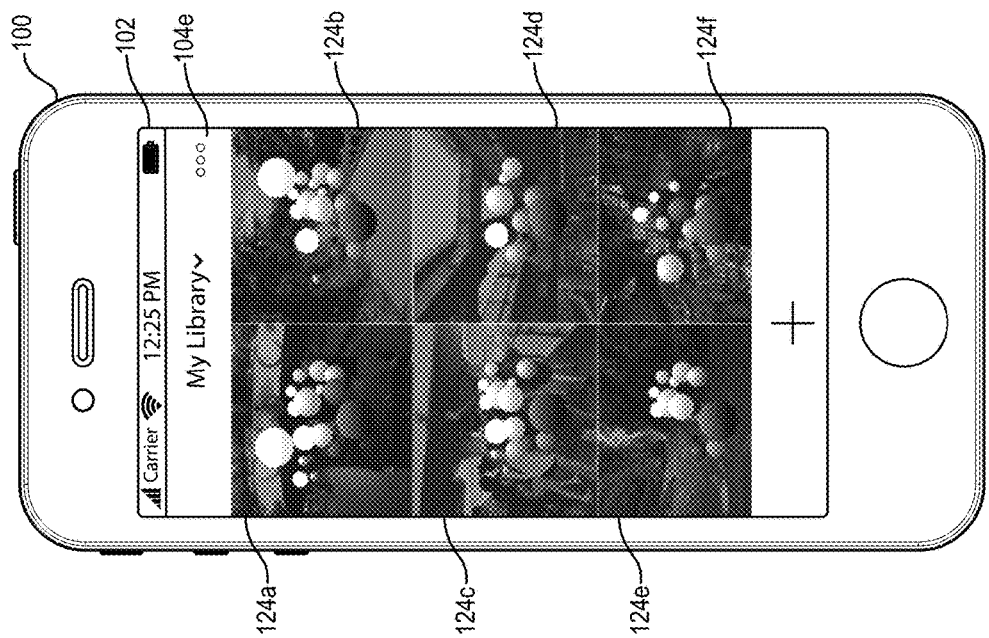
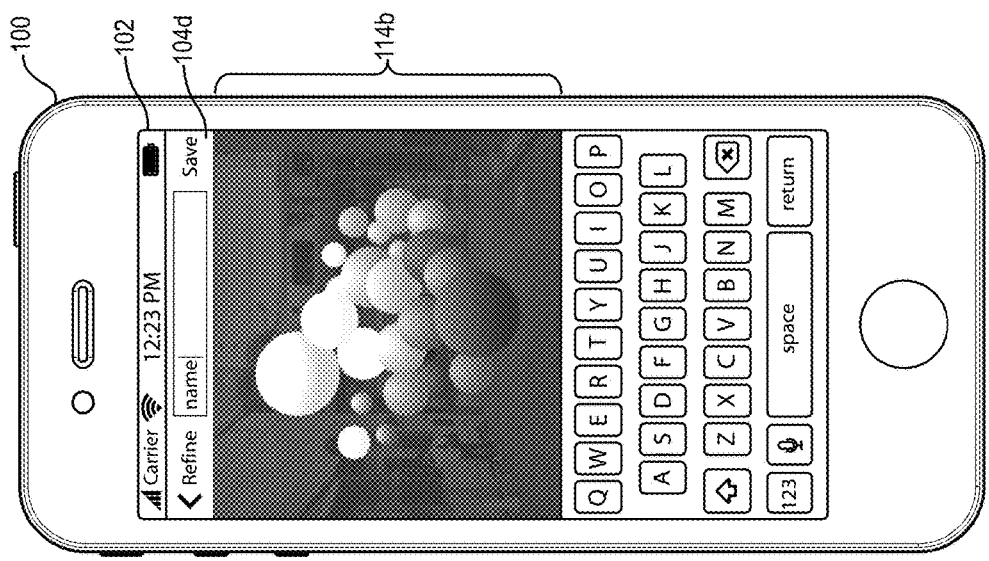
Fig. 2G
Fig. 2F

PROVIDING VISUALIZATIONS OF CHARACTERISTICS OF AN IMAGE

CROSS REFERENCE TO RELATED APPLICATIONS

This application claims priority to and the benefit of U.S. Provisional Application No. 62/119,007, filed Feb. 20, 2015, the entire contents of which are hereby incorporated by reference.

BACKGROUND

1. Technical Field

One or more embodiments described herein relate generally to providing visualizations of characteristics of an image. More specifically, one or more embodiments relate to extracting characteristics of a source image and generating a visual model of the characteristics of the source image.

2. Background and Relevant Art

Digital image editing methods allow users to edit and manipulate digital images in a variety of ways. For example, users can edit an image's colors, saturation, opacity, and so forth. Conventional methods typically do not provide an intuitive method of helping a user understand or conceptually visualize the characteristics of an image. Some digital image editing software provides number values or sliders to represent and allow for editing of image characteristics. Unfortunately, number values and sliders are often non-intuitive.

Users can perform advanced edits in order to create beautiful and realistic images. For instance, a user may have an image containing various characteristics that create a desirable "mood" that the user may wish to duplicate that same mood in other images. A problem arises, however, in that it is typically very difficult to match characteristics across images. For example, a user may have a digital photograph of a model in a superhero costume that was taken under studio lights. If the user tries to overlay the photograph of the superhero model over another digital photograph of a city skyline, the user will quickly determine that the resulting image is not realistic looking due to the mismatches in the colors, grading, lighting, etc. between the two images. The photograph of the superhero model will likely have bolder and more saturated color characteristics due to the controlled environment in which the photograph was taken. The photograph of the city skyline will likely have color characteristics that are more varied. Accordingly, when the user overlays the superhero image over the city skyline image, the result is an unrealistic and easily identified hodge-podge.

For this reason, methods have arisen that attempt to match characteristics between digital images. For example, in one method, a user can use a slider control to adjust the hue, saturation, and opacity of an overlay image in an attempt to match the characteristics of a base image. This method, however, is not intuitive and requires the user to make vague estimates as to when the characteristics of one image match the characteristics of another image. Furthermore, existing methods fail to give an intuitive and easily understood representation of the characteristics within the base image.

Thus, a need exists for a method for providing representations of image characteristics and matching characteristics between images that is intuitive, accurate, and provides a user with control and granularity in applying the matching characteristics to a target image.

SUMMARY

One or more embodiments described herein provide benefits and/or solve one or more of the foregoing or other problems in the art with systems and methods that provide users with intuitive and accurate image visualization tools that allow users to easily identify various characteristics within an image. In particular, one or more embodiments provide interactive visualization models of image characteristics such as image colors, saturation, opacity, and so forth. The visualization models allow a user to intuitively understand and optionally edit image characteristics. One or more embodiments enable a user to match the look and feel of a first image to a second image.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIGS. 1A-1C illustrate a source image and various views of a visualization model of the source image in accordance with one or more embodiments;

FIGS. 2A-2G illustrate graphical user interfaces for utilizing the image editing system in accordance with one or more embodiments;

DETAILED DESCRIPTION

Figure 2A:
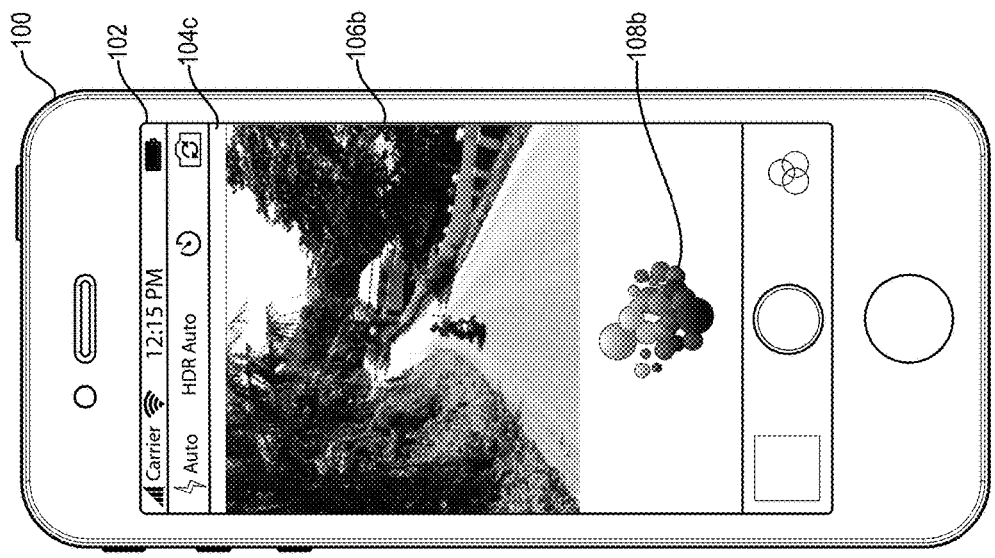

One or more embodiments described herein include an image editing system that provides users with intuitive and accurate image visualization tools that allow users to easily identify various characteristics within an image. In particular, the image editing system provides visualization models of image characteristics, such as the colors of an image, the opacity of an image, the luminance of an image, and so forth. The visualization models allow a user to intuitively understand and optionally edit characteristics through the visualization model. For example, the image editing system can provide a histogram visualization model that presents colors within an image as selectable histogram bubbles. In response to a user resizing, moving, or "popping" a bubble in the histogram, the image editing system can change or delete an entire group of colors within the image.

Additionally, the image editing system provides users with an easy and intuitive way to extract and match characteristics across digital images. For example, the image editing system generates a visualization model (e.g., a histogram) that provides a user with an accurate representation of the colors extracted from an image. The image editing system provides the visualization model to a user for the user to inspect and edit. The image editing system then generates a transformation model based on the visualization model (including any user edits to the visualization model). The transformation model can allow the look and feel from one image to be applied to another. For example, the transformation model based on a color histogram includes instructions detailing how the image editing system can change the colors of one image to match the colors of another image.

For example, the image editing system applies the transformation model to the target image by using the instructions in the transformation model to change the color characteristics of one image to match or resemble the color characteristics of another image. Similarly, the image editing system can perform similar processes with transformation models associated with an image's luminosity, color saturation, and so forth to the target image.

The process by which the image editing system extracts characteristics from a source image, generates a visualization of the extracted characteristics, receives user interactions with the generated visualization, builds a transformation model associated with the generated visualization, and applies the transformation model will now be described with reference to a series of user interfaces shown in FIGS. 1A-2G. Generally, although FIGS. 1A-2G illustrate embodiments in which the image editing system displays the series of user interfaces on the touch screen of a client-computing device such as a smart phone, tablet, smart wearable, etc., it is understood that the image editing system can provide the user interfaces illustrated in FIGS. 1A-2G on a standard display of a client-computing device such as a laptop or desktop computer. Furthermore, while the functionality of the image editing system described with reference to FIGS. 1A-2G is described in the context of a native application, in additional embodiments, the functionality of the image editing system can apply to network environments. For example, the image editing system can provide GUIs as part of a website for display in connection with a web browser.

As illustrated in FIG. 1A, the client-computing device 100 includes a touch screen display 102 that can display user interfaces and by way of which user input may be received or detected. As used herein, a "touch screen display" refers to an input device that includes a display of a client-computing device that is capable of detecting user interactions that a user performs with respect to the display. For example, a user can interact with a client-computing device in the form of touch gestures made with respect to the touch screen display (e.g., tap gestures, swipe gestures, pinch gestures, reverse-pinch gestures, etc.). Additionally, the client-computing device 10 may include any other suitable input device, such as a touch pad or those described below in reference to FIG. 6.

As described above, the image editing system extracts various characteristics from a source image. As used herein, the "characteristics" of an image include a variety of information related to an image. For example, an image's color characteristics can include the color palette represented in the image. Additionally, characteristics associated with an image include, but are not limited to, hue, saturation, opacity, luminosity, color grading, image sharpness, and so forth.

Accordingly, as illustrated in FIG. 1A, the image editing system provides a source image GUI 104a on the touch screen display 102 of the client-computing device 100. In one or more embodiments, the source image GUI 104a enables a user to inspect a selected source image 106a (e.g., a picture of a flower bouquet). The user can select the source image 106a via a storage associated with the client-computing device 100 (e.g., a digital photograph library, etc.), or can capture the source image 106a via a digital camera associated with the client-computing device 100. In additional or alternative embodiments, the image editing system receives the source image 106a in a variety of formats and sizes.

As described above, the image editing system generates an interactive visualization model (such as a three-dimensional histogram) representative of a source image's characteristics. Also as described above, the image editing system generates a visualization model based on the characteristics of the source image. As used herein, a "visualization model" refers to a graphical representation of data. In one or more embodiments, the image editing system generates a visualization model that is a three-dimensional histogram based on the color characteristics of the source image. With reference to the present disclosure, the three-dimensional histograms illustrated herein are highly intuitive representations of an image's color characteristics. Additionally, the type of color analysis described herein preserves core appearance attributes within a source image such as hue and saturation. Although the functionality of the image editing system is described with reference to color matching across images, the same functionality can be used with reference to other types of analysis, such as, but not limited to, color grading, etc.

Thus, in one or more embodiments the image editing system generates a three-dimensional histogram representing the color characteristics of an image. The three-dimensional histogram can be based on a color scheme or space. For example, the three-dimensional histogram can be based on an RGB color space, an HSV color space, a HSL color space, a CMYK color space, or other color space. The figures illustrate visualization models using an RGB color scheme. One will appreciate, however, that other embodiments can use other color schemes. The RGB color schema is a model in which red, green, and blue are combined in various ways to reproduce a broad array of colors. For example, in a percentage notation, the brightest saturated red can be written in an RGB triplet, "(100%, 0%, 0%)." In a digital 8-bit notation, the brightest saturated green can be written in the RGB triplet, "(0, 255, 0)." Furthermore, in hexadecimal notation, the brightest saturated blue can be written, "#0000FF." In one or more embodiments, the three-dimensional histogram includes an X-axis representative of red color characteristics of an image, a Y-axis representative of green color characteristics of the image, a Z-axis representative of blue color characteristics of an image, and a central grey axis, as shown and described in below in relation to FIGS. 1B and 1C.

Accordingly, in one or more embodiments, the image editing system generates a three-dimensional histogram 108a, as shown in FIG. 1B, representing the RGB color characteristics of the source image 106a by placing a visualization element (e.g., a bubble) at the location representing the RGB value for each color in the source image 106a. In one or more embodiments, the image editing system includes visualization elements 110a, 110b, 110c within the three-dimensional histogram 108a to represent the RGB color characteristics of the source image 106a. For example, the image editing system identifies a color within the source image 106a, and place a visualization element within the three-dimensional histogram 108a at the appropriate vertex representing the RGB value associated with the identified color. In one embodiment, the image editing system scales the size of the added visualization element in a manner that is proportional to the dominance of the color within the source image 106a. Thus, larger visualization elements represent dominant colors within the source image 106a, while smaller visualization elements represent less dominant colors. In alternative embodiments, the system uses other types of visualization elements (e.g., circles, squares, etc.).

In order to create a meaningful visualization, the image editing system extracts many or all of the colors from the source image 106a. For example, the image editing system begins by subdividing the color space (i.e., the space within the cube created by the three-dimensional histogram associated with colors) in five-degree hue angles, and creating a bucket for each resulting hue angle. The image editing system then places each image pixel within the source image 106a into one of the corresponding 360 buckets. In other words, the image editing system creates groupings of the pixels of the input digital image that have values of the visual characteristic (e.g., hue) within a threshold (e.g., five-degrees). Thus, within one of the 360 buckets, there may be several image pixels ranging within five degrees of color. The image editing system next takes an average of the values in each bucket such that each bucket represents a single value.

If the image editing system were to create a visualization element for each bucket, the resulting histogram could be very crowded and hard to use. Accordingly, the image editing system condenses the 360 buckets. In one or more embodiments, the image editing system condenses the 360 buckets by subdividing the color space by a larger hue angle. For example, by subdividing the color space by a hue angle of sixty degrees, the image editing system condenses the original 360 buckets to just six buckets. Thus, the image editing system then creates six visualization elements for display in the three-dimensional histogram 108a that corresponds to the six buckets. Alternatively, the image editing system can use more than six buckets and corresponding visualization elements. In any event, the image editing system selects a number of buckets and bubbles to use to provide a meaningful representation. If a source image has many colors the visualization may include a greater number of visualization elements. On the other hand, if a source image has a small number of colors, the visualization may include only six or fewer visualization elements. Alternatively, the image editing system allows a user to select a desired granularity (i.e., number of visualization elements).

Figure 1C:
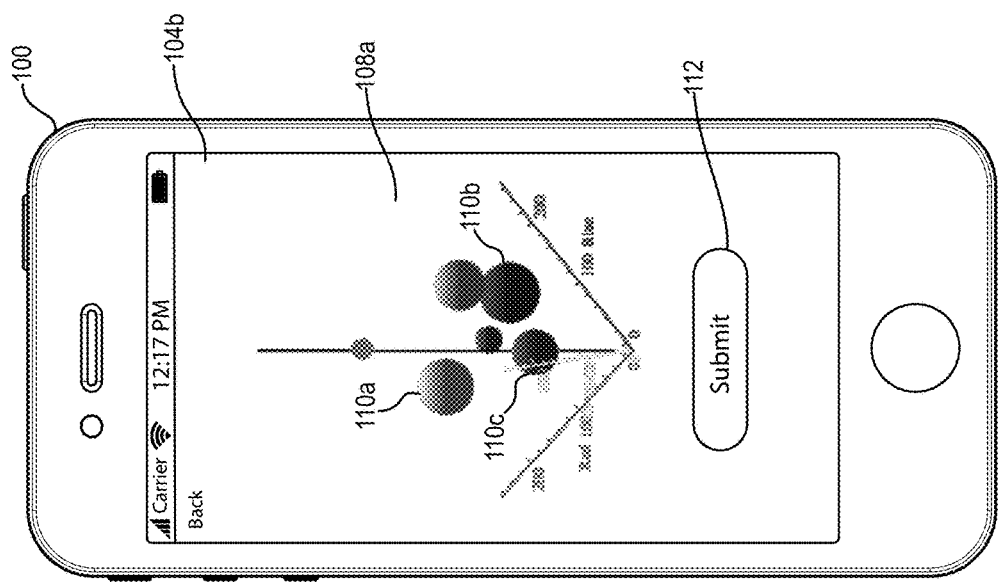

The image editing system scales the size of the resulting visualization element according to the value of the bucket. Accordingly, each visualization element 110a, 110b, 110c within the three-dimensional histogram 108a represents a hue angle, saturation level, and lightness of a dominant color found within the source image 106a. As described below, FIGS. 1B and 1C illustrate various views of the three-dimensional histogram 108a visualization of the source image 106a shown in FIG. 1A.

As shown in FIG. 1B, the image editing system generates the three-dimensional histogram that includes visualization elements (e.g., bubbles) representing the dominant colors found within the source image. Although the description of FIGS. 1A-2G details various color characteristics, it will be appreciated that colors in FIGS. 1A-2G are represented in gray scale. Although the source image may contain additional colors (i.e., yellow, orange, shades of green), in one or more embodiments, the image editing system condenses the colors of a source image such that the resulting histogram is representative of the most dominant colors within the source image. The image editing system scales the visualization elements 110a, 110b, 110c (e.g., the bubbles) within the histogram such that the size of each visualization element 110a, 110b, 110c is proportionate to the dominance of the associated color represented in the source image. Additionally, the image editing system places each visualization element 110a, 110b, 110c at the appropriate position within the X, Y, and Z axes within the histogram representing the RGB value of the color associated with the visualization element 110a, 110b, 110c.

As mentioned above, the image editing system generates the three-dimensional histogram such that the histogram is capable of responding to user interactions; in other words, such that the histogram is interactive. For example, in one or more embodiments, as illustrated in FIGS. 1B and 1C, the user provides input via the visualization GUI 104b displayed on the touch screen display 102 that causes the three-dimensional histogram to rotate, flip, zoom in, zoom out, and so forth. As shown between FIGS. 1B and 1C, a user can rotate the three-dimensional histogram in order to better view the visualization elements 110a, 110b, 110c contained therein.

The image editing system also receives additional user interactions representative of different types of edits to the three-dimensional histogram. In one or more embodiments, the image editing system enables a user to edit a three-dimensional histogram in the following ways: delete a visualization element (e.g., pop a bubble), scale a visualization element, mark a visualization element, move a visualization element, or select a visualization element. The effect of each type of user edit will be described in more detail below.

In response to a user deleting a visualization element within the three-dimensional histogram 108a associated with the color characteristics of the source image 106a, the image editing system removes or fades the color (i.e., the hue and saturation) associated with that visualization element in the source image 106a. For example, popping or deleting a dark blue bubble represented in the three-dimensional histogram 108a shown in FIG. 1B would have the effect of removing the dark blue color(s) from the source image 106a shown in FIG. 1A. In one or more embodiments, in response to a user popping a bubble within a histogram, the image editing system adds another visualization element (e.g., bubble) to the histogram that was previously not dominant enough to be included in the histogram. Alternatively, the image editing system may not add an additional visualization element to the histogram 108a, but rather allows the histogram 108a to remain with only five visualization elements. Additionally, in one or more embodiments, in response to the user deleting a visualization element, the image editing system shifts the remaining visualization elements within the histogram 108a to compensate.

In response to a user scaling or marking a visualization element within the three-dimensional histogram 108a associated with various color characteristics of the source image 106a, the image editing system emphasizes the color(s) associated with scaled visualization element. For example, scaling the visualization element associated with the color pink in the three-dimensional histogram 108a shown in FIG. 1B would have the effect of emphasizing the pink color(s) found in the source image 106a shown in FIG. 1A. In at least one embodiment, in response to the user scaling a visualization element, the image editing system shifts the remaining visualization elements accordingly within the three-dimensional histogram, or causes the color(s) associated with the scaled or marked visualization element to become more saturated.

In response to the user moving a visualization element within the three-dimensional histogram 108a associated with various color characteristics in the source image 106a, the image editing system changes the color(s) associated with the moved visualization element to correspond with the moved visualization element's new location within the histogram 106a. For example, a user may move the dark blue visualization element to a location farther along the axis associated with the color green. In response to such a move, the image editing system shifts the dark blue colors within the source image 106a shown in FIG. 1A to a color that has more green. Accordingly, the image editing system also shifts/adjusts the color of the moved visualization element displayed within the three-dimensional histogram 108a.

In response to the user selecting a visualization element within the three-dimensional histogram 108a associated with various color characteristics of the source image 106a, the image editing system shifts the neutral colors within the source image 106a toward the color represented by the selected visualization element. For example, the source image 106a shown in FIG. 1A includes some off-white colors that are represented by a visualization element along a vertical axis in the histogram 108a shown in FIG. 1B. In response to a user selecting the visualization element associated with the color pink within the histogram 108a, the image editing system shifts the visualization element associated with the neutral off-white color toward the selected visualization element such that the visualization element associated with the neutral off-white color takes on a pink tone. Once the user has satisfactorily edited the three-dimensional histogram 108a, the user can instruct the image editing system to store the three-dimensional histogram 108a by selecting the submit button 112, as shown in FIGS. 1B and 1C.

As mentioned above, the image editing system can display source images, target images, and visualizations on a display of the client-computing device 100. For example, FIGS. 2A-2G illustrate another embodiment illustrating additional features of the image editing system. For instance, as shown in FIG. 2A, the image editing system provides a combined display GUI 104c on the touch screen display 102 of the client-computing device 100. Through the combined display GUI 104c, the user can upload, or otherwise select a source image 106b. In response, the image editing system generates a visualization representative of one or more characteristics of the uploaded source image 106b. Alternatively, if the image editing system has previously generated a visualization associated with the source image 106b, the image editing system retrieves the stored visualization for display via the combined display GUI 104c.

As shown in FIG. 2A, the visualization comprises a three-dimensional histogram 108b. In one or more embodiments, as shown, the image editing system may not display the X, Y, and Z axes as part of the three-dimensional histogram 108b. As discussed above, the three-dimensional histogram 108b represents one or more characteristics of the source image 106b. For example, the three-dimensional histogram 108b illustrated in FIG. 2A is representative of color characteristics of the source image 106b.

Figure 2C:
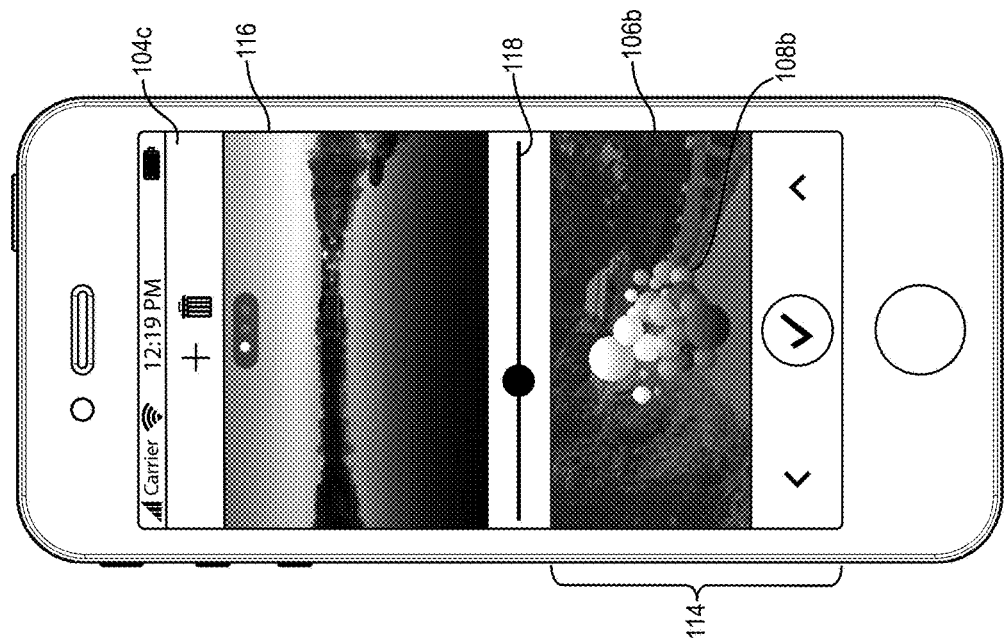
Figure 2B:
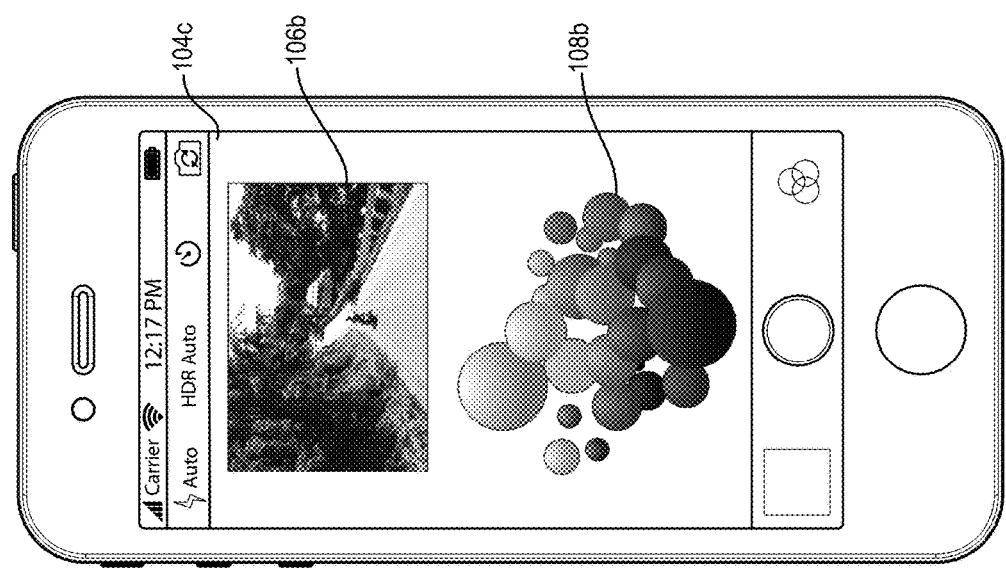

As shown in FIG. 2B, the image editing system allows the user to manipulate the combined display GUI 104c to zoom in on and rotate the three-dimensional histogram 108b. The image editing system also enables the user to edit the three-dimensional histogram 108b via the combined display GUI 104c by removing visualization elements, selecting visualization elements, moving visualization elements, etc. as described above. The image editing system adjusts the source image 106b in response to changes made to the three-dimensional histogram 108b. Thus, the three-dimensional histogram 108b provides an intuitive tool for editing characteristics of the source image 106b.

Once the user has satisfactorily viewed and/or edited the three-dimensional histogram 106b, the user cam request that the image editing system apply a transformation model based on the three-dimensional histogram 106b to a target image. For example, as shown in FIG. 2C, the user can upload or otherwise select a target image 116 that the image editing system displays within an upper portion of the combined display GUI 104c. The combined display GUI 104c also displays a combined source image visualization 114a including the source image 106b as well as the three-dimensional histogram 108b associated with the source image 106b. The process by which the image editing system builds a transformation model based on a visualization is described further below with reference to FIG. 3. In one or more embodiments, the combined display GUI 104c in this configuration also includes an image slider 118 that enables a user to zoom in and out of one or both of the combined source image visualization 114a and the target image 116.

As shown in FIG. 2D, in response to the user indicating satisfaction with the three-dimensional histogram 108b (e.g., by tapping the check button 120), the image editing system applies the transformation model associated with the three-dimensional histogram 108b to the target image 116. Furthermore, in one or more embodiments, the image editing system provides a wipe animation (e.g., indicated by the wipe line 122) to show the user the difference between the original target image 116' and the edited target image 116" after the application of the transformation model associated with the three-dimensional histogram 108b. In this way, a user can review the changes to the target image 116, and compare the edited target image 116" to the original target image 116' before making any changes permanent. In at least one embodiment, the user can manually manipulate the wipe line 122 to compare changes to a particular area of the target image 116.

As illustrated in FIG. 2E, the image editing system enables the user to manipulate the relative display sizes of the combined source image visualization 114a and the target image 116 in order to better view one or the other (e.g., via a swipe up touch gesture over the center of the combined display GUI 104c). In one or more embodiments, as shown in FIG. 2F, the combined display GUI 104c also contains various controls that enable the user to save an edited target image along with three-dimensional histogram that has been applied to it. As shown, the image editing system provides a save dialog GUI 104d that enables the user to add a title to the combined source image visualization 114b.

In one or more embodiments, the image editing system saves the combined source image visualization 114b as an object to a personal library such that the user can apply the transformation model associated with the source image visualization 114b to additional target images. For example, as shown in FIG. 2G, the image editing system generates a library GUI 104e displaying a library of saved combined source image visualizations. In one or more embodiments, each saved combined source image visualization is a selectable object 124a-124f In response to the user selecting any of the selectable objects 124a-124f, the image editing system retrieves the associated three-dimensional histogram and transformation model to apply the mood represented therein to a target image.

Figure 3:
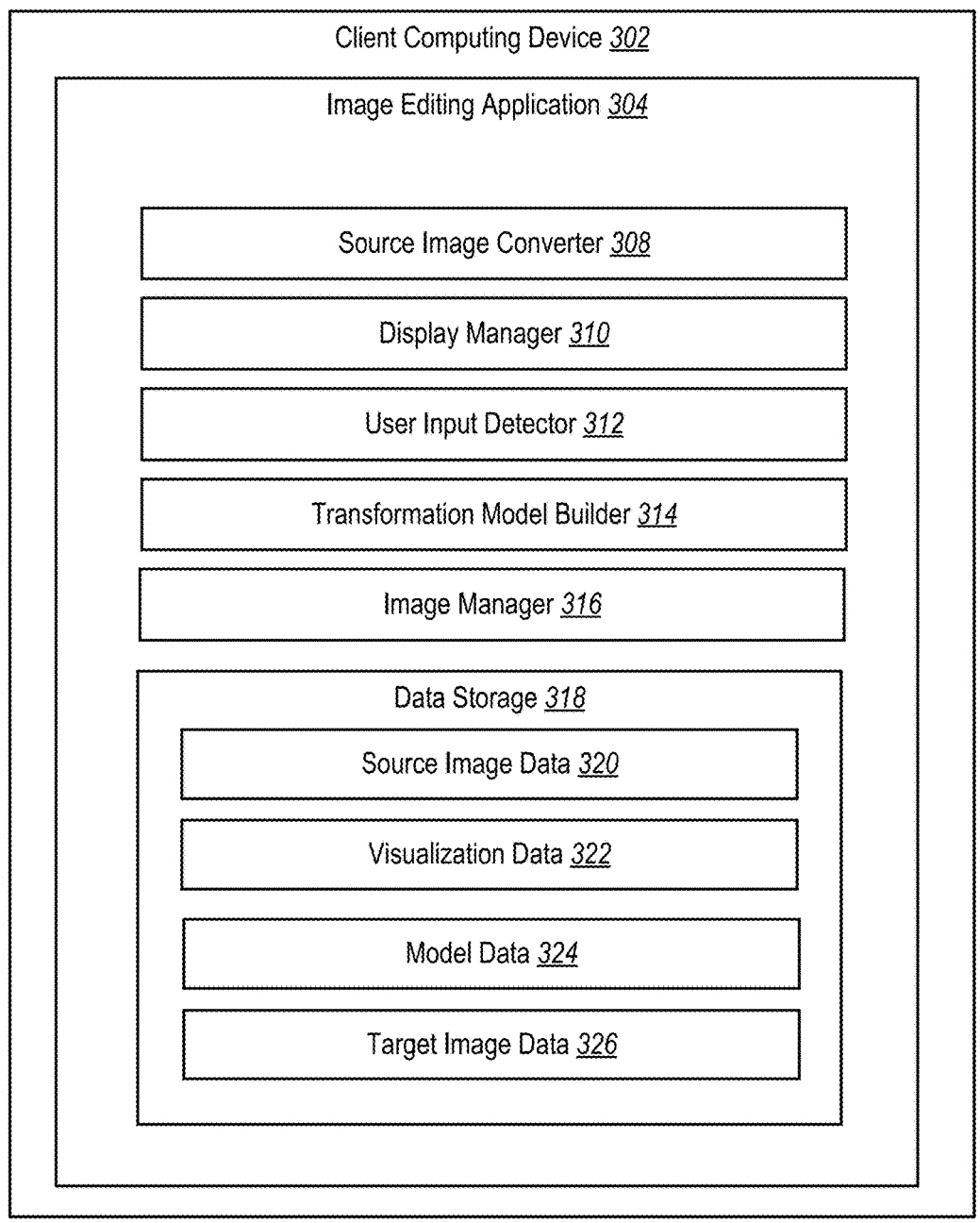
FIG. 3 illustrates a schematic diagram of an image editing system in accordance with one or more embodiments.

FIG. 3 illustrates a schematic diagram illustrating an example embodiment of the image editing system. In at least one embodiment, the image editing system is part of an image editing application 304 installed on a client-computing device 302 (e.g., as in the client-computing device 100 illustrated in FIGS. 1A-2G). Examples of an image editing application 304 include ADOBE® PHOTOSHOP® or ADOBE® LIGHTROOM®, etc. In one or more embodiments, the image editing system can include a source image converter 308, a display manager 310, a user input detector 312, a transformation model builder 314, an image manager 316, and a data storage 318. The data storage 318 can store source image data 320, visualization model data 322, model data 324, and target image data 326. Although the disclosure herein describes the components within the image editing system 306 as separate, as illustrated in FIG. 1, any of the components may be combined into fewer components, such as into a single facility or module, or divided into more components as may serve one or more embodiments.

Each of the components of the image editing system can be implemented using a client-computing device including at least one processor executing instructions that cause the image editing system to perform the processes described is all be implemented by a single server device, or across multiple server devices. Additionally, a combination of one or more server devices and one or more client devices implement components of the image editing system. Furthermore, in one embodiment, the components of the image editing system comprise hardware, such as a special-purpose processing device to perform a certain function. Alternatively, the components of the image editing system comprise a combination of computer-executable instructions and hardware.

In one or more embodiments, the image editing system is a native application installed on a client-computing device (e.g., the client-computing device 302). For example, the image editing system may be a mobile application that installs and runs on a mobile device, such as a smart phone or a tablet. Alternatively, the image editing system is a computer desktop application, widget, or other form of a native computer program. Alternatively, the image editing system is a remote application that is accessed by a client-computing device. For example, the image editing system may be a web application that is executed within a web browser of a client-computing device.

As mentioned above, and as shown in FIG. 3, the image editing system includes a source image converter 308. The source image converter receives a source image (e.g., the source image 106a as shown in FIG. 1A, or the source image 106b as shown in FIG. 2A). For example, as described above, the image editing system generates a visualization of a source image (e.g., a three-dimensional histogram as illustrated in FIG. 1B). In one or more embodiments, the source image converter 308 receives one or more source images in a variety of formats (e.g., TIF, JPG, PNG, GIF, etc.) in a variety of sizes. In one embodiment, the source image converter 308 compresses received source images to a particular size.

Additionally, in one or more embodiments, the source image converter 308 extracts one or more characteristics of a source image. For ease of explanation, the process of extracting characteristics and generating a visualization is described with regard to a source image's color characteristics. In alternative embodiments, the same process is utilized to generate visualization models for other types of extracted characteristics, such as opacity, color saturation, and so forth.

In order to extract color characteristics from a source image, the source image converter 308 identifies a range of color information associated with the source image. In one or more embodiments, the color information includes colors included in the source image, percentages of the image covered by each color, a hue associated with each color, a saturation level associated with each color, an opacity level associated with each color, etc. The source image converter 308 extracts color information pixel-by-pixel, or in any other manner. Once the source image converter 308 has extracted a range of color characteristics from a source image, the source image converter utilizes the extracted color characteristics to generate a visualization model.

This same process can be represented in pseudo code that broadly describes how the source image converter 308 utilizes extracted color characteristics to generate a visualization model. The following example pseudo code includes some constants and utility functions:

```
GrayQ(rgb) returns true if: (max(rgb) – min(rgb)) < max(GrayDistance,
GraySaturation*max(rgb));
ConvertRGBtoHue(rgb):
if (r == g == b)
    0.
else
    ArcTan( 2*r – g – b, (g – b) sqrt(3.0))/Degree;
```

Once, these functions have been initialized, the pseudo code continues by subdividing the color space represented by the source image into hue angles, and creating a bucket for each resulting hue angle. The source image converter 308 can then place each image pixel extracted from the source image into one of the corresponding 360 buckets. Thus, within one of the 360 buckets, there may be several image pixels ranging within five degrees of color. The source image converter 308 can next take an average of the values in each bucket such that each bucket represents a single value. Aspects of this process is described in the following example pseudo code:

```
In ImageHistogram3DsRGB
Group pixels in buckets with same bucket value.
The bucket value is
if( GrayQ(rgb) )
    bucketID = floor(max(rgb)/( (maxPixelValue + 1.0)/FirstGraySteps)
    );
else {
    int bucketID1 = floor(max(rgb)/( (maxPixelValue + 1.0)/ ColorSteps)
    );
```

-continued

```
   int bucketID2 =round(mod(ConvertRGBtoHue(rgb), 360,
     hueSeparation/2.0)
/hueSeparation);
   Combine bucketID1 & bucketID2 to get unique IDs,
     for example bucketID = 1000 * bucketID1 + bucketID2 + 1000;
};
```

As described above, the source image converter 308 will merge the created buckets in order to create a visualization that is easier to read and less cluttered. For example, the source image converter 308 can merge visualization elements (e.g., bubbles) that have a difference in hue, color, or saturation below a threshold value. Additionally, the source image converter 308 can merge visualization elements (e.g., bubbles) that are within a threshold distance of each other in the visualization model. Sill further, the source image converter 308 can remove visualization elements (e.g., bubbles) below a threshold size. Aspects of the process of merging buckets is represented by the following example pseudo code:

```
In ImageHistogram3DsRGBMergedHue.
Get histogramData as defined above.
Reduce bubble count:
Split histogram {rgb, count} in gray and colored lists of bubbles.
if (grayQ(rgb))
     place {rgb, count} in gray list
else
     place {rgb, count} in colored list
Merge Gray bubbles
Group {rgb,count} in gray list in buckets with same bucket value =
floor(max(rgb)/
(maxPixelValue + 1)/FinalGraySteps);
Merge each bucket in linear RGB – MergeBucketsInLinearRGB
Merge Colored bubbles
Group {rgb,count} in colored list into buckets with same bucket value =
round(mod(ConvertRGBtoHue(rgb), 360, FinalHueSeparation/2) /
FinalHueSeparation);
Merge each bucket in linear RGB – MergeBucketsInLinearRGB
```

In one or more alternative embodiments, the source image converter 308 reduces the three-dimensional histogram to another format. For example, in some embodiments, the display of a client-computing device 302 may be limited such that it would be impractical to display a three-dimensional histogram. Accordingly, the source image converter 308 reduces the three-dimensional histogram into a more easily displayed two-dimensional histogram. In one embodiment, the source image converter 308 reduces a three-dimensional histogram representing color characteristics of a source image into a two-dimensional histogram containing axes related to only hue and saturation of the colors represented in the source image. In additional or alternative embodiments, the source image converter 308 reduces the three-dimensional histogram based on other parameters.

As mentioned above, the source image converter 308 generates the visualization model that represents the color characteristics of an image and provides interactive functionality within the generated visualization model. For example, in one or more embodiments, the image editing system provides a three-dimensional histogram to a user that the user can interact with in order to rotate, scale, zoom in, zoom out, and even edit. Accordingly, the source image converter 308 generates a three-dimensional histogram that, in response to user input, can be rotated, scaled, zoomed in, zoomed out, and edited.

As mentioned above, and as shown in FIG. 3, the image editing system also includes a display manager 310. The display manager 310 provides, manages, and/or controls a graphical user interface (or simply "user interface") that allows a user to interact with an interactive visualization generated by the source image converter 308 (e.g., such as the visualization display GUI 104b). For example, the display manager 310 provides a user interface that facilitates the display of an interactive three-dimensional histogram. Likewise, the display manager 310 provides a user interface that allows a user to edit all or a portion of an interactive three-dimensional histogram. In response to a user editing an interactive visualization via the provided user interface, the display manager 310 communicates the edited visualization to the image editing system.

Accordingly, the display manager 310 facilitates the input of text or other data to be used in editing interactive visualizations. For example, the display manager 310 provides a user interface for display on a touch screen display (e.g., the touch screen display 102) that includes a touch screen display keyboard and other touch screen display controls. A user can interact with the touch screen display using one or more touch gestures to select and edit portions of the interactive visualization.

Furthermore, the display manager 310 provides and updates a graphical user interface, or transition between two or more graphical user interfaces. For example, in one embodiment, the display manager 310 provides an interactive visualization via a display of a client-computing device (e.g., the client-computing device 302). Then, in response to a detected interaction with the interactive visualization, the display manager 310 provides an enlarged view of a portion of the interactive visualization (i.e., in response to a "zoom-in" gesture) within the graphical user interface, highlights a portion of the interactive visualization within the graphical user interface, adds additional visual indicators to the interactive visualization within the graphical user interface, rotates the interactive visualization, and so forth. Additionally, the display manager 310 transitions from one graphical user interface to another. For example, the display manager 310 may transition through a series of graphical user interfaces in response to user input.

As further illustrated in FIG. 3, the image editing system includes a user input detector 312. In one or more embodiments, the user input detector 312 detects, receives, and/or facilitates user input in any suitable manner. In some examples, the user input detector 312 detects one or more user interactions with respect to the user interface. As referred to herein, a "user interaction" means a single interaction, or combination of interactions, received from a user by way of one or more input devices.

For example, the user input detector 312 detects a user interaction from a keyboard, a mouse, a touch pad, a touch screen, and/or any other input device. In the event a client computing device includes a touch screen (e.g., as with the client-computing device 100 illustrated in FIGS. 1A-2G), the user input detector 312 detects one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface. The user input detector 312 may additionally, or alternatively, receive data representative of a user interaction. For example, the user input detector 312 may receive one or more user configurable parameters from a user, one or more commands from the user, and/or any other suitable user input.

As mentioned above, and as illustrated in FIG. 3, the image editing system 306 also includes a transformation model builder 314. As mentioned above, the transformation model builder 314 builds a transformation model based on a generated visualization associated with a source image. In one or more embodiments, the image editing system applies the resulting transformation model to a target image in order to give the target image the same look or "mood" as the source image (e.g., as described with reference to FIGS. 2A-2G). In one embodiment, the transformation model builder 314 creates a transformation model in the form of a look-up table based on information from the visualization that also include any edits made to the visualization by a user. In one or more embodiments, the look-up table contains transformation instructions that enable the image editing system to perform specific transformations to a target image in order to give the target image the same look (i.e., color scheme or "mood") as the source image.

In order to create a look-up table associated with color characteristics of a source image, the transformation model builder 314 creates an interpolation function that converts an input RGB value from a target image to an output RGB value from the source image. For example, in one or more embodiments, the look-up table is an RGB coordinate grid, where each point within the table represents a color with specific hue and saturation. The transformation model builder 314 determines and adds an interpolation function to each point within the look-up table that the image editing system applies to the color represented therein in order to shift the color toward the source image. By way of example, the transformation model builder 314 determines an interpolation function for a particular color in the look-up table by identifying that, in order to shift toward the source image, that particular color must be 50% more saturated, and so forth. Thus, once the transformation model builder 314 has processed a three-dimensional bubble histogram into a look-up table, the look-up table will contain a full set of instructions for how to shift each color represented within the look-up table toward the source image, thereby matching the "mood" between the source image and one or more target images.

The process by which the transformation model builder 314 builds a look-up table based on a three-dimensional histogram can be represented in pseudo code. For example, the process for building a look-up table begins with initializing constants and various utility functions as illustrated in the following example pseudo code:

```
float ConvertRGBtoSat(vec3 rgb) { return 1.0 - min(rgb)/max(rgb, 0.0001) ); };
float ConvertsRGBTosRGBLuminance(vec3 rgb) {
        return (0.2 * r^ApproxsRGBGamma + 0.7 * g^ApproxsRGBGamma + 0.1 *
            b^ApproxsRGBGamma) ^ (1.0/ApproxsRGBGamma);
};
vec3 RestoresRGBLuminance(vec3 rgb, vec3 newrgb)
{
    return newrgb * ConvertsRGBTosRGBLuminance(rgb) /
max(0.00001,ConvertsRGBTosRGBLuminance(newrgb));
};
```

Next, as described above, the transformation model builder 314 determines an interpolation function that converts an input RGB value from a target image to an output RGB value from the source image. In one or more embodiments, the interpolation function takes not only colors, but also additional characteristics such as saturation, into account. Aspects of this process are illustrated by the following example pseudo code:

```
// This object provides a function hueToSatFactor that returns a saturationFactor calculated
from hueSatList using linear interpolation
float hueToSatFactor(float hue)
{
 returns(sat) calculated from hue and hueSatList using linear interpolation;
//        hueToSatFactor can be implemented as a table. Defined once, called many times
//        for example: return hueSatTable[ mod(round(hue), 360 ) ];
};
// build the table to be used by hueToSatFactor
void GetHueToSatFactor(histogramData)
{
  colored = the histogramData rows {rgb, count} where GrayQ(rgb) == false;
  if (colored.size( ) == 0), return with an identity function(hue) { return(1) };
  For all rows in colored {
    // convert rgb to hue and saturation
};
  // extend both ends of hue range so that we can interpolate without discontinuity across +- 180
  // fill in hue gaps > 120, where bubbles are missing
// define an interpolation function hueToSatFactor that from hueSatList can calculate sat for
every intermediate hue value -180 .. 360 degrees
};
```

In one or more embodiments, the transformation model builder 314 fine-tunes the determined interpolation function by shifting various mid tones. The process of shifting mid tones begins with selecting a particular bubble for a midshift. In one or more embodiments, the transformation model builder 314 will select the largest or most saturated bubble represented in the transformation model to shift the other bubbles toward.

Once the interpolation function is determined, the transformation model builder 314 generates a lookup table (LUT) based on the interpolation function. Aspects of generating a LUT are represented by the following example pseudo code:

formation model builder 314 builds a transformation model in the format of a look-up table where each point within the look-up table represents an RGB value, and includes an interpolation function. Accordingly, in one or more embodiments, the image manager 316 looks up each RGB value from a target image within the look-up table, and applies the interpolation function assigned to that RGB value within the look-up table that RGB value within the target image. Thus, by applying the interpolation functions within the look-up table to a target image, the image manager 316 shifts the hue

```
//         this object builds a Lookup Table from a histogram
// Convert grid coordinate to RGB coordinate grid {max,max,max} -> rgb {255,255,255}
// subtract 0 as C++ is zero based, 1 for Mathematica 1-based
rgb LUTGridToRGB( ijk, int LUTSize, int maxPixelValue )
{
   return (ijk-0)/(LUTSize-1) maxPixelValue;
};
// Calculate RGB values per grid point, rgb values are in range 0..1 for cube format
rgb LUTGridToNewRGB( ijk, int LUTSize, int maxPixelValue )
{
       //    local variables {rgb, newRGB, lutRGB},
       rgb = LUTGridToRGB(ijk, LUTSize, maxPixelValue);
       newRGB = RGBtoNewRGB(rgb);
       lutRGB = newRGB/maxPixelValue;
       return(lutRGB);
       );
//         main entry point
LUT BuildLUTFromHistogramData( histogramData, int LUTSize )
{
       BuildLookModifiers(histogramData);  //          initialize the modifiers
       rgb LUT[LUTSize][LUTSize][LUTSize];  // empty table
       for all lut grid positions i,j,k {
              LUT[i][j][k] = LUTGridToNewRGB( { i, j, k }, LUTSize, maxPixelValue );
       };
       return(LUT);
};
```

As mentioned above, and as shown in FIG. 3, the image editing system also includes an image manager 316. The image manager 316 applies a transformation model built by the transformation model builder 314 to a target image in order to give the target image the same look and feel as a source image. For example, as mentioned above, the transand saturation of colors within the target image toward those of the source image, thereby matching the characteristics of the source image to the target image. Aspects of the process for interpolating RGB values is illustrated by the following example pseudo code:

```
// This object converts an input rgb value to an output rgb value, modified by the desired look
//          scale the saturation
vec3 AdjustSaturation(vec3 rgb, float saturationFactor)
{return saturationFactor * rgb + ConvertsRGBTosRGBLuminance (rgb) * (1 -
saturationFactor);
};
// roll off saturation gain at high saturations
float RollOffSaturation(float saturation , float rawSaturationFactor)
//          change saturation according to hueToSatFactor
vec3 ChangeSaturation (vec3 rgb)
{
 hue = ConvertRGBtoHue(rgb);
 saturationFactor = hueToSatFactor (hue);
 saturationFactor = RollOffSaturation(ConvertRGBtoSat(rgb) , saturationFactor);
saturationFactor = saturationFactor * SaturationFactorForMidTones
(ConvertRGBtoSat(rgb));
 newRGB = AdjustSaturation(rgb, saturationFactor);
 return(newRGB);
 };
vec3 RGBtoNewRGB (vec3 rgb )
{newRGB = ChangeSaturation(rgb);                    // increase saturation
// Keep rgb values away from clipping (caused by preserving luminance)
LimitMinSlopeToClip = 1/8; // Range ( >0 .. <1 )
 maxRGBValue = maxPixelValue - LimitMinSlopeToClip (maxPixelValue - max(rgb) );
 newRGB = newRGB / max(1.0, newRGB / maxRGBValue);
```

-continued

```
newRGB = ShiftMidtones(newRGB);        // change mid tones
return(newRGB);
};
```

Additionally, as mentioned above, and as illustrated in FIG. 3, the image editing system includes a data storage 318 including source image data 320, visualization data 322, model data 324, and target image data 326. In one or more embodiments, the source image data 320 includes data related to source images received by the image editing system. Furthermore, in one or more embodiments, the visualization data 322 may include data related to histograms based on source images and generated by the source image converter 308. Additionally, in one or more embodiments, model data 324 may include data related to models and look-up tables based on three-dimensional histograms and generated by the transformation model builder 314. Finally, in one or more embodiments, target image data 326 may include data related to target images both before a model is applied to a target image by the image manager 316, and after a model is applied to a target image by the image manager 316.

Figure 4:
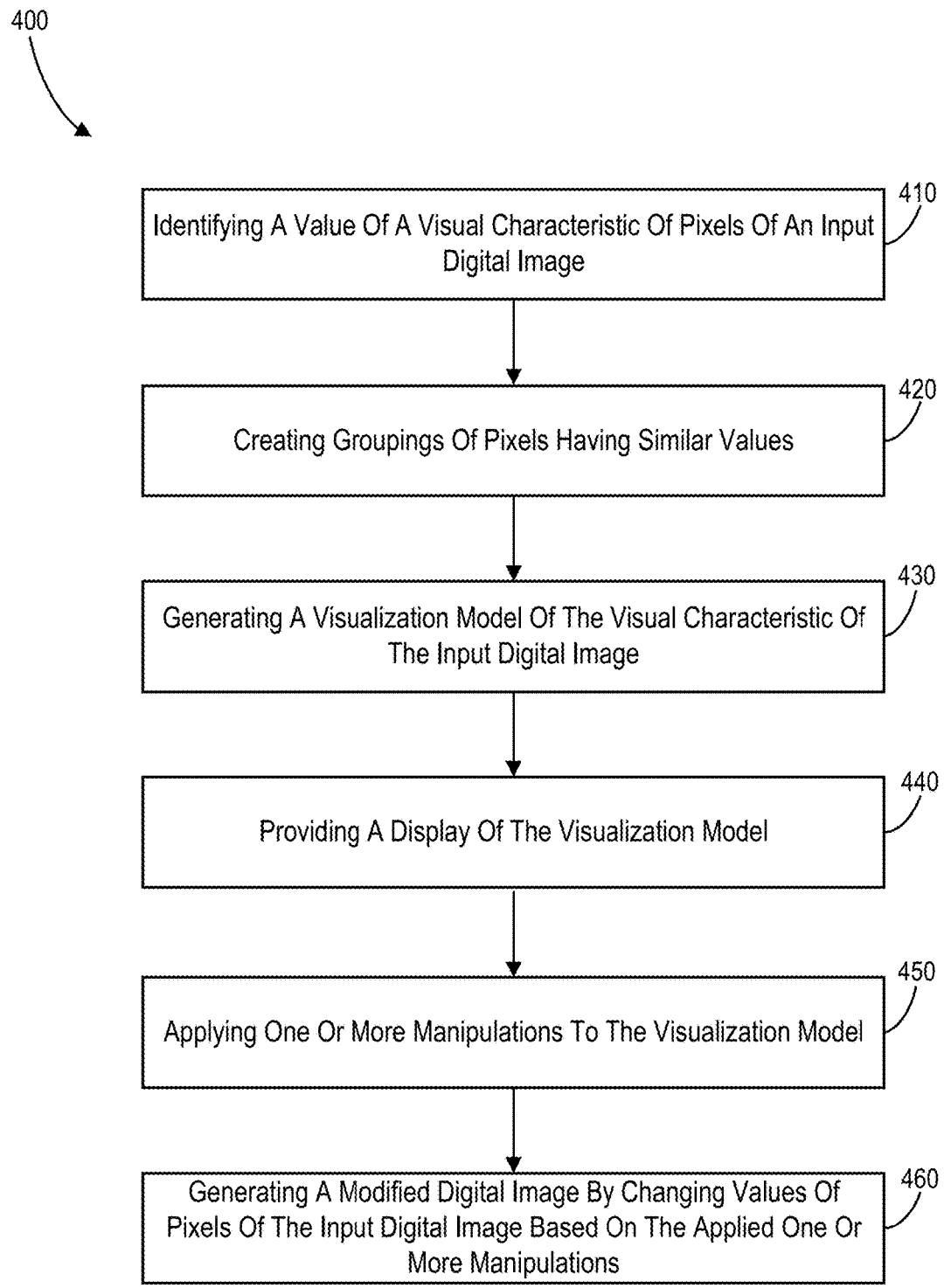
FIG. 4 illustrates a flowchart of a series of acts in a method of modifying visual characteristics of a digital image in accordance with one or more embodiments.

FIGS. 1A-3, the corresponding text, and the examples, provide a number of different systems and devices for matching characteristics across images. In addition to the foregoing, one or more embodiments can also be described in terms of flowcharts comprising acts and steps in a method for accomplishing a particular result. For example, FIG. 4 illustrates a flowchart of exemplary methods in accordance with one or more embodiments. The method described in relation to FIG. 4 may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of one example method 400 of modifying visual characteristics of a digital image. The method 400 includes an act 410 of identifying a value of a visual characteristic of pixels of an input digital image. For example, in one or more embodiments, act 410 involves extracting color values for pixels of the input digital image. More particularly, act 410 can involve extracting RGB values for pixels of the input digital image. Additionally, act 410 can involve extracting one or more of color characteristics, opacity characteristics, or any other type of display characteristics from the input digital image.

Additionally, the method 400 includes an act 420 of creating groupings of pixels having similar values. For example, act 420 can involve creating groups of pixels having a color, hue, or saturation value with a threshold of each other. In one or more embodiments, act 420 involves subdividing a color space by a hue angle (such as five degrees) to create a bucket for each resulting hue angle and assigning each pixel in the input digital image into one of the buckets based on a color value of the pixel.

Furthermore, the method 400 includes an act 430 of generating a visualization model of the visual characteristic of the input digital image. In particular, the act 430 involves generating a visualization model 108a including a plurality of visualization elements 110a-110c that each represent one of the groupings of the pixels. In at least one embodiment, act 430 involves generating a visualization model 108a visually quantifying the identified visual characteristic. For example, act 430 can involve sizing each visualization element 110a-110c based a number of pixels in the corresponding grouping of pixels. Additionally, in at least one embodiment, act 430 can involve removing any visualization elements 110a-110c from the visualization model that have a size below a threshold size limit. Still further, act 430 can involve positioning each visualization element 110a-110c in the visualization model 108a based on the values of the visual characteristic of the pixels in the corresponding grouping of pixels.

Additionally, act 430 can involve generating a 3D histogram 108a with axes of red, green, and blue. Act 430 can then involve determining an average RGB value of the pixels in each grouping of pixels and positioning each visualization element 110a-110c in the 3D histogram 108a based on the average RGB value of the pixels in the grouping of pixels represented by the visualization element 110a. Generating the visualization elements can involve generating spheres with a color corresponding to the average RGB value of the pixels in the grouping of pixels represented by the visualization element.

Also, act 430 can involve determining a distance between a pair of visualization elements is less than a threshold. Act 430 can then involve merging the pair of visualization elements based on determining that the distance between the pair of visualization elements is less than the threshold.

The method 400 also includes an act 440 of providing a display of the visualization model 108a. In particular, the act 440 involves displaying a user interface including the input digital image and the visualization model 108a. For example, act 440 can involve displaying the input digital image 106b in a first portion of the user interface 104c and the visualization model 108a in a second portion of the user interface 104c. Alternatively, act 440 can involve displaying the input digital image 106b in the user interface 104c and overlaying the visualization model 108a over the input digital image 106b.

The method 400 further includes an act 450 of applying one or more manipulations to the visualization model. For example, act 450 can involve receiving user input applying one or more manipulations to one or more visualization elements 110a-110c in the visualization model 108a. For example, act 450 can involve receiving one or more of a selection of a visualization element, a resizing of a visualization element, a movement of a visualization element, a deletion of a visualization element, and a marking of a visualization element.

Also, the method 400 includes an act 460 of generating a modified digital image by changing values of pixels of the input digital image based on the applied one or more manipulations. In particular, act 460 can involve generating a modified digital image by changing values of the visual characteristic of pixels associated with the one or more visualization elements based on the applied one or more manipulations.

Figure 5:
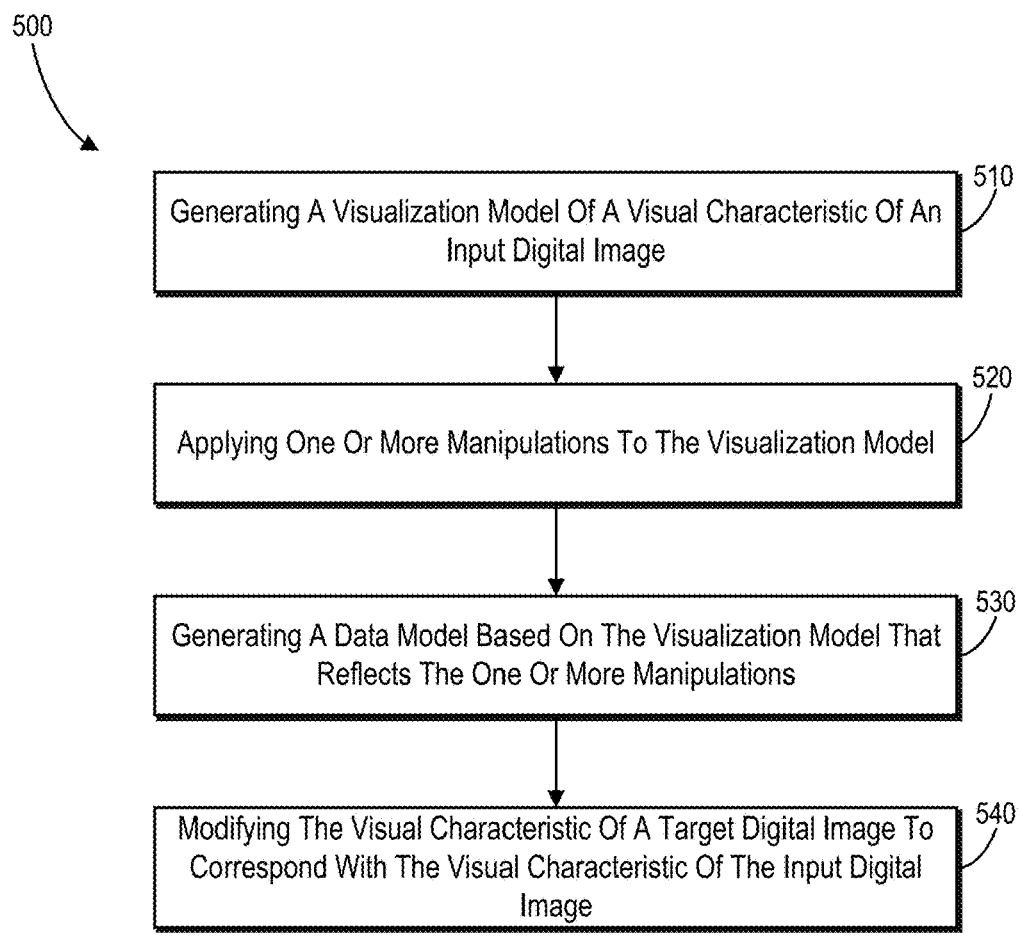
FIG. 5 illustrates a flowchart of a series of acts in a method of modifying visual characteristics of a target digital image to match a source digital image in accordance with one or more embodiments.

FIG. 5 illustrates a flowchart of another example method 500 of modifying visual characteristics of a target digital image to match a source digital image. The method 500 includes an act 510 of generating a visualization model of a visual characteristic of an input digital image. For example, act 510 can involve generating a visualization model 108a of a visual characteristic of an input digital image 106b including a plurality of visualization elements 110a-110c that each represent a grouping of pixels having values of the visual characteristic within a threshold of each other. Act 510 can involve sizing each visualization element based a number of pixels in the grouping of pixels and positioning each visualization element in the visualization model based on the values of the visual characteristic of the pixels in the grouping of pixels. Act 510 can involve identifying an RGB value for each pixel of the input digital image. More particularly, act 510 can involve generating a 3D histogram with axes of red, green, and blue and the visualization elements comprise bubbles.

Additionally, the method 500 includes an act 520 of applying one or more manipulations to the visualization model. For example, act 520 can involve providing a display of the visualization model and receiving user input applying one or more manipulations to one or more visualization elements in the visualization model. Act 520 can involve resizing of a visualization element, movement of a visualization element, or a deletion of a visualization element.

Furthermore, the method 500 includes an act 530 of generating a transformation model based on the visualization model that reflects the one or more manipulations. For example, act 530 can involve building a look-up table, wherein each point within the look-up table comprises an original RGB value and an interpolation function. The interpolation function at each point converts an input value of the visual characteristic to a value of the visual characteristic present in the visualization model of the visual characteristic of the input digital image.

The method 500 also includes an act 540 of modifying the visual characteristic of a target digital image to correspond with the visual characteristic of the input digital image. For example, act 540 can involve applying an interpolation function from the look-up table to each pixel in the target digital image.

The method 500 further includes an act 550 of interpolating the extracted characteristics. In particular, the act 550 involves interpolating, based on the identified transformation model, each of the extracted plurality of characteristics from the selected target image. For example, in at least one embodiment, interpolating each of the extracted plurality of characteristics from the selected target image includes identifying an interpolation function from the transformation model that converts an input characteristic from the target image to one or more of the characteristics from the source image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
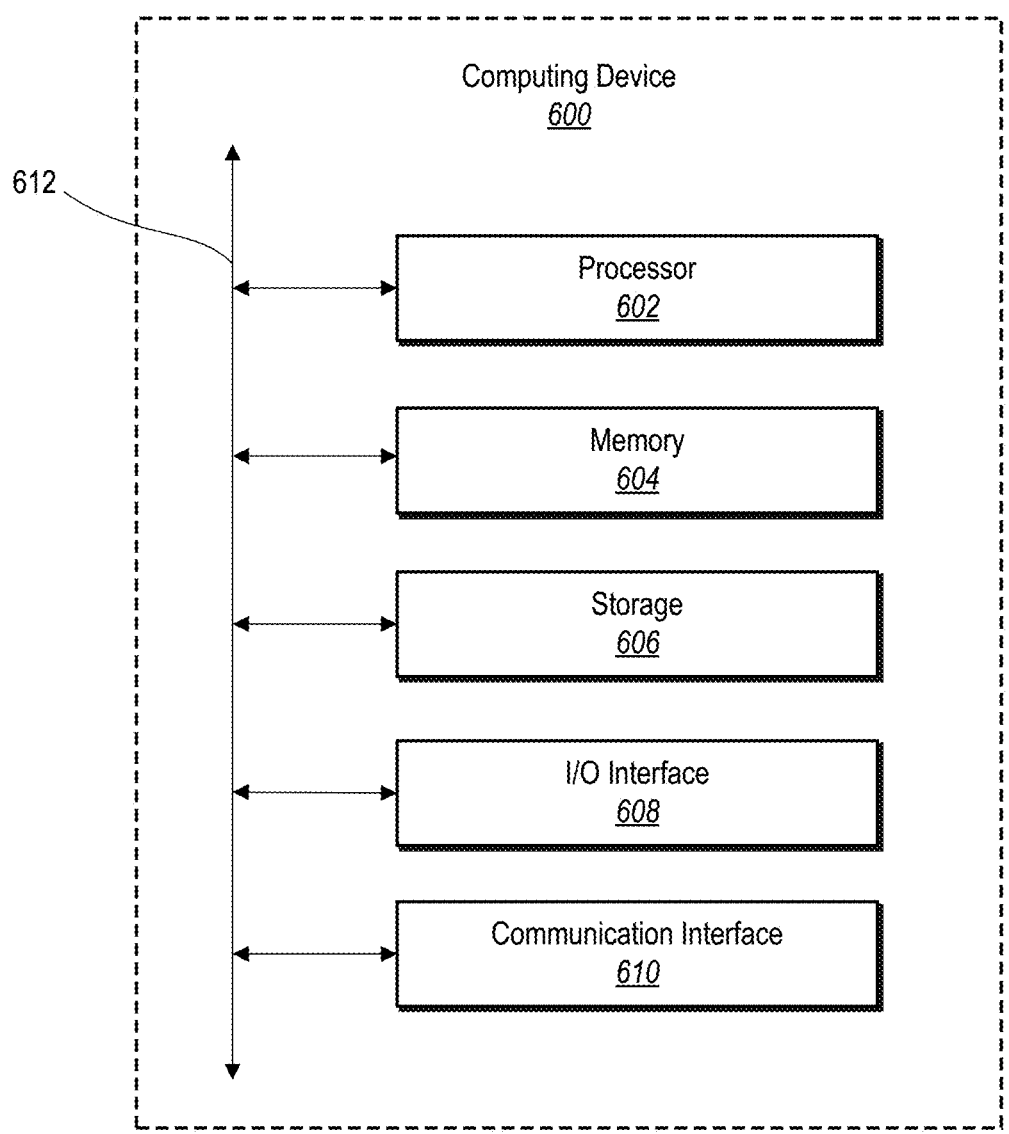
FIG. 6 illustrates a block diagram of an exemplary computing device in accordance with one or more embodiments.

FIG. 6 illustrates a block diagram of an exemplary computing device 600 that may be configured to perform one or more of the processes described above. One will appreciate that the image editing system may be implemented by one or more computing devices such as the computing device 600. As shown by FIG. 6, the computing device 600 can comprise a processor 602, memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In particular embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, the storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 7:
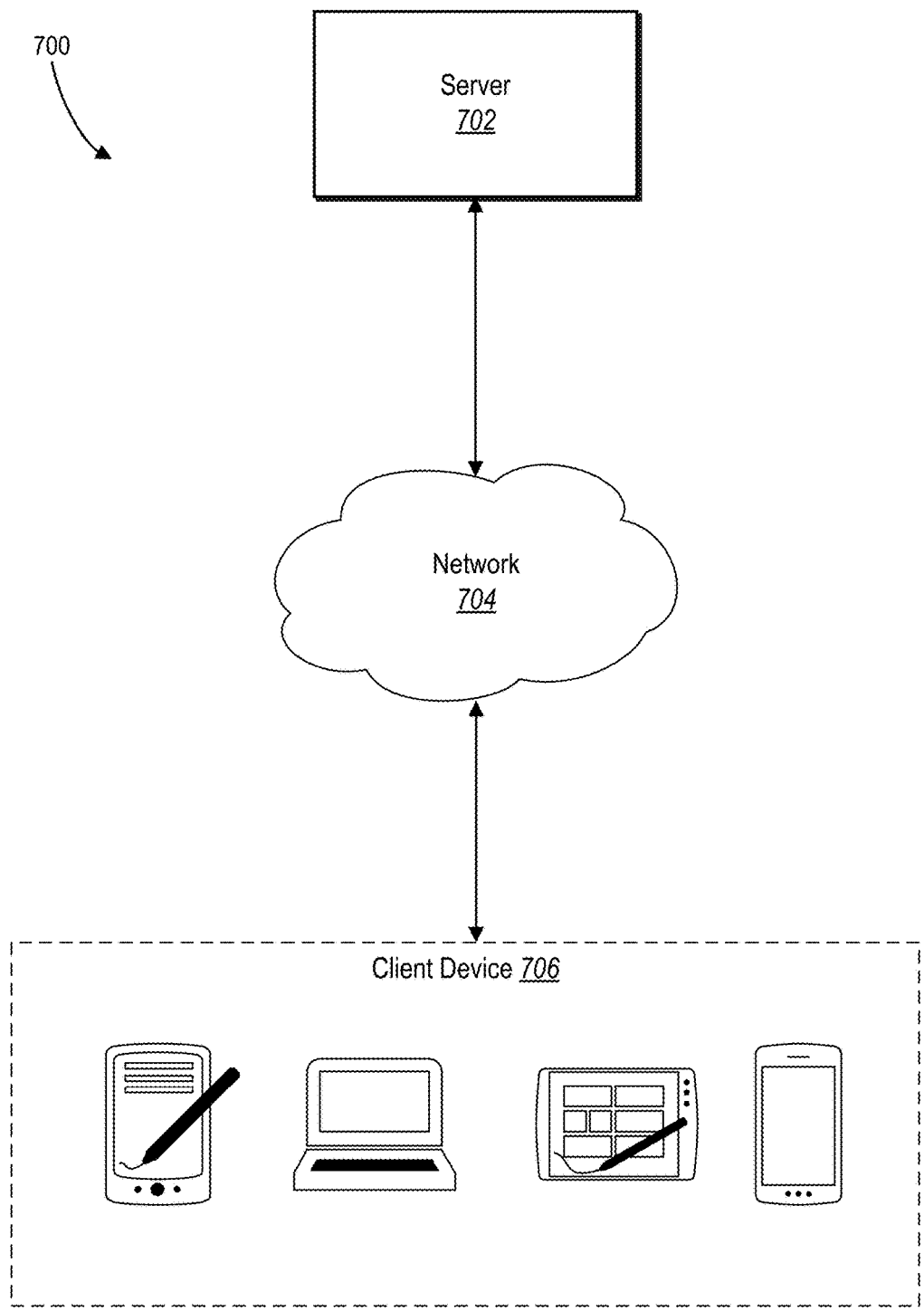
FIG. 7 is an example network environment in which the image editing system can operate in accordance with one or more embodiments.

FIG. 7 illustrates an example network environment 700 of in which the image editing system can operate. The network environment 700 includes a client system 706, and a server 702 connected to each other by a network 704. Although FIG. 7 illustrates a particular arrangement of the client system 706, the server 702, and the network 704, this disclosure contemplates any suitable arrangement of the client system 706, the server 702, and the network 704. As an example and not by way of limitation, the client system 706 and the server 702 may be connected to each other directly, bypassing network 704. As another example, the client system 706 and the server 702 may be physically or logically co-located with each other in whole or in part. Moreover, although FIG. 7 illustrates a particular number of client systems 706, servers 702, and networks 704, this disclosure contemplates any suitable number of client systems 706, servers 702, and networks 704. As an example and not by way of limitation, network environment 700 may include multiple client system 706, servers 702, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706 and the server 702 to the communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 706. A client system 706 may enable a network user at client system 706 to access network 704. A client system 706 may enable its user to communicate with other users at other client systems 706.

In particular embodiments, client system 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 702 may be capable of linking a variety of entities. As an example and not by way of limitation, server 702 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating the server 702. In particular embodiments, however, the server 702 and third-party systems may operate in conjunction with each other to provide analytics services to users of the server 702 or third-party systems. In this sense, server 702 may provide a platform, or backbone, which other systems, such as third-party systems, may use to provide analytic or data or tracking services and functionality to users across the Internet.

In particular embodiments, a third-party system may include a third-party content object provider. A third-party content object provider may include one or more sources of content objects, which may be communicated to a client system 706. As an example and not by way of limitation, content objects may include information regarding things or activities of interest to the user, such as, for example, digital media, digital designs, digital photographs, digital videos, digital audio, clip art, fonts, etc. As another example and not by way of limitation, content objects may include metadata that describes the content objects.

In particular embodiments, server 702 may include a variety of servers, sub-systems, programs, modules, logs, and data stores. In particular embodiments, server 702 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. Server 702 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for editing digital images, a method of modifying visual characteristics of digital images comprising:
    identifying, by one or more processors, a value of a visual characteristic for each of a plurality of pixels of an input digital image;
    creating groupings of the pixels of the input digital image having similar color values;
    generating, by the one more processors, a 3D histogram including a plurality of visualization elements that represent dominate groupings of the groupings of the pixels, the dominate groupings comprising a subset of the groupings of the pixels representing dominant colors in the input digital image;
    providing a display of the 3D histogram on a touch screen display;
    receiving a user touch screen gesture on the 3D histogram displayed on the touch screen display that deletes one of the plurality of visualization elements from the 3D histogram; and
    in response to the received user touch screen gesture on the 3D histogram displayed on the touch screen display that deletes one of the plurality of visualization elements from the 3D histogram:
        adding a new visualization element to the 3D histogram that is associated with one or more groupings of the pixels that were previously not dominant enough to be included in the 3D histogram;
        generating a modified digital image by:
            removing, from the input digital image, one or more colors associated with the deleted visualization element of the 3D histogram, and
            adding to the input digital image one or more colors associated with the new visualization element added to the 3D histogram.

2. The method as recited in claim 1, wherein generating the 3D histogram comprises sizing each visualization element based on a number of pixels in a corresponding grouping of pixels.

3. The method as recited in claim 2, wherein generating, by the one more processors, the 3D histogram including the plurality of visualization elements that represent dominate groupings of the groupings of the pixels comprises excluding visualization elements for grouping from the 3D histogram that have a size below a threshold size limit.

4. The method as recited in claim 1, wherein generating the 3D histogram comprises positioning each of the plurality of visualization elements in the 3D histogram based on the values of the visual characteristic of the pixels in a corresponding dominant grouping of pixels.

5. The method as recited in claim 1, wherein identifying the value of the visual characteristic of pixels of the input digital image comprises identifying a color value for each pixel of the input digital image.

6. The method as recited in claim 5, wherein the 3D histogram comprises axes of red, green, and blue.

7. The method as recited in claim 6, further comprising: determining an average color value of the pixels in each of the dominant groupings of the pixels; and positioning each visualization element in the 3D histogram based on the average color value of the pixels in a corresponding dominant grouping of the groupings of pixels represented by the visualization element.

8. The method as recited in claim 7, wherein the visualization elements comprise spheres with a color corresponding to the average color value of the pixels in the corresponding dominant grouping of pixels represented by the visualization element.

9. The method as recited in claim 1, further comprising:
determining a distance between a pair of visualization elements is less than a threshold; and
based on determining that the distance between the pair of visualization elements is less than the threshold, merging the pair of visualization elements.

10. The method as recited in claim 1, wherein creating groupings of the pixels of the input digital image having similar color values comprises:
subdividing a color space by a hue angle to create a bucket for each resulting hue angle; and
assigning each pixel in the input digital image into one of the buckets based on a color value of the pixel.

11. A system for modifying visual characteristics of digital images comprising:
a touch screen display;
at least one processor; and
at least one non-transitory computer-readable storage medium storing instructions thereon that, when executed by the at least one processor, cause the system to:
extract color values from pixels of an input digital image;
form groupings of pixels from the input digital image having similar color values;
generate a 3D histogram including a plurality of visualization elements that represent dominate groupings of the groupings of pixels, the dominant groupings comprising a subset of the groupings of pixels representing dominant colors in the input digital image;
size each visualization element to indicate a dominance of the similar color values in the input digital image;
provide a display of the 3D histogram on the touch screen display;
receive a user touch screen gesture on the 3D histogram displayed on the touch screen display that deletes one of the plurality of visualization elements from the 3D histogram; and
in response to the received user touch screen gesture on the 3D histogram displayed on the touch screen display that deletes one of the plurality of visualization elements from the 3D histogram:
add a new visualization element to the 3D histogram that is associated with one or more groupings of pixels that were previously not dominant enough to be included in the 3D histogram;
generate a modified digital image by:
removing, from the input digital image, one or more colors associated with the deleted visualization element of the 3D histogram, and
adding to the input digital image the one or more colors associated with the new visualization element added to the 3D histogram.

12. The system as recited in claim 11, further comprising instructions that, when executed by the at least one processor, cause the system to:
generate a transformation model based on the 3D histogram that reflects the manipulated 3D histogram by building a look-up table, wherein each point within the look-up table comprises an original color value and an interpolation function that converts an input color to a color value of a visualization element in the 3D histogram; and
modify a color of a target digital image to correspond with the modified digital image by applying the interpolation functions to the pixels of the target digital image.

13. A non-transitory computer-readable medium storing instructions thereon that, when executed by at least one processor, cause a computer system to:
identify a value of a visual characteristic for each of a plurality of pixels of an input digital image;
create groupings of the pixels of the input digital image having similar color values;
generate a 3D histogram including a plurality of visualization elements that represent dominant groupings of the groupings of the pixels, the dominant groupings comprising a subset of the groupings of pixels representing dominant colors in the input digital image;
provide a graphical user interface on a touch screen display comprising the input digital image in a first portion and a display of the 3D histogram in a second portion;
receive a user touch screen gesture on the 3D histogram in the second portion of the graphical user interface on the touch screen display, wherein the user touch screen gesture on the 3D histogram alters the 3D histogram by deleting a visualization element of the 3D histogram; and
in response to the received user touch screen gesture on the 3D histogram in the second portion of the graphical user interface on the touch screen display that deletes a visualization element of the 3D histogram:
add a new visualization element to the 3D histogram that is associated with one or more groupings of the pixels that were previously not dominant enough to be included in the 3D histogram;
generate a modified digital image by:
removing, from the input digital image, one or more colors associated with the deleted visualization element of the 3D histogram,
adding to the input digital image the one or more colors associated with the new visualization element added to the 3D histogram; and
replace, in the first portion of the graphical user interface on the touch screen display, the input digital image with the generated modified digital image.

14. The non-transitory computer-readable medium as recited in claim 13, wherein the instructions, when executed by the at least one processor, cause the computer system to generate the 3D histogram by sizing each visualization element based on a number of pixels in a corresponding grouping of pixels and to shape each visualization element as a sphere.

15. The non-transitory computer-readable medium as recited in claim 14, wherein the instructions, when executed by the at least one processor, cause the computer system to further generate the 3D histogram including the plurality of visualization elements that represent dominant groupings of the groupings of the pixels by excluding visualization elements for grouping from the 3D histogram that have a size below a threshold size limit.

16. The non-transitory computer-readable medium as recited in claim 15, wherein the instructions, when executed by the at least one processor, cause the computer system to further generate the 3D histogram by positioning each of the plurality of visualization elements in the 3D histogram based on the color values of the pixels in a corresponding dominant grouping of pixels.

17. The non-transitory computer-readable medium as recited in claim 16, wherein the instructions, when executed by the at least one processor, cause the computer system to identify the value of the visual characteristic of pixels of the input digital image by identifying a color value for each pixel of the input digital image.

18. The non-transitory computer-readable medium as recited in claim 13, further comprising instructions thereon that, when executed by the at least one processor, cause the computer system to:
- determine an average color value of the pixels in each of the dominant groupings of the groupings of pixels; and
- position each visualization element in the 3D histogram based on the average color value of the pixels in a corresponding dominant groupings of the grouping of pixels represented by the visualization element.

19. The non-transitory computer-readable medium as recited in claim 13, further storing instructions thereon that, when executed by the at least one processor, cause the computer system to:
- determine a distance between a pair of visualization elements is less than a threshold; and
- based on the distance between the pair of visualization elements being less than the threshold, merge the pair of visualization elements.

20. The non-transitory computer-readable medium as recited in claim 19, wherein the instructions, when executed by the at least one processor, cause the computer system to create groupings of pixels of the input digital image that have values of the visual characteristic within the threshold by:
- subdividing a color space by a hue angle to create a bucket for each resulting hue angle; and
- assigning each pixel in the input digital image into one of the buckets based on a color value of the pixel.

* * * * *